United States Patent
Bakhtina et al.

(10) Patent No.: US 11,375,727 B2
(45) Date of Patent: Jul. 5, 2022

(54) HEAT TOLERANT FILLING BASE FOR HIGH TEMPERATURE, HIGH-PRESSURE COOKING CO-EXTRUSION

(71) Applicant: Intercontinental Great Brands LLC, East Hanover, NJ (US)

(72) Inventors: Asya Bakhtina, East Hanover, NJ (US); Michelle Beaver, East Hanover, NJ (US); Kelly Christiansen, East Hanover, NJ (US); Yeong-Ching Albert Hong, East Hanover, NJ (US); Joshua Smith, East Hanover, NJ (US); Liyi Yang, East Hanover, NJ (US)

(73) Assignee: Intercontinental Great Brands LLC, East Hanover, NJ (US)

( * ) Notice: Subject to any disclaimer, the term of this patent is extended or adjusted under 35 U.S.C. 154(b) by 0 days.

(21) Appl. No.: 16/506,239

(22) Filed: Jul. 9, 2019

(65) Prior Publication Data

US 2021/0007369 A1 Jan. 14, 2021

(51) Int. Cl.
*A23D 7/00* (2006.01)
*A23L 33/115* (2016.01)
(Continued)

(52) U.S. Cl.
CPC ............ *A23D 7/003* (2013.01); *A23L 33/115* (2016.08); *A23L 33/125* (2016.08); *A23P 10/35* (2016.08); *A23P 30/20* (2016.08)

(58) Field of Classification Search
CPC ..... A23D 7/003; A23L 33/115; A23L 33/125; A23P 10/35; A23P 30/20
(Continued)

(56) References Cited

U.S. PATENT DOCUMENTS 4,753,812 A 6/1988 Wilson
4,762,725 A 8/1988 Player
(Continued)

FOREIGN PATENT DOCUMENTS

EP 685165 12/1995
EP 2100511 9/2009
(Continued)

OTHER PUBLICATIONS

International Search Report and Written Opinion for International Application No. PCT/US2020/039882 dated Oct. 23, 2020.

*Primary Examiner* — Brent T O'Hern
(74) *Attorney, Agent, or Firm* — Fitch, Even, Tabin & Flannery LLP

(57) ABSTRACT

Soft and creamy lipid-based food fillings suitable for high-temperature, high-pressure cooking co-extrusion are provided. In one approach, the filling includes about 30 to about 45 weight percent of an edible lipid having a melting point of about 45° C. or lower, about 0.5 to about 5 weight percent of a high oil-binding capacity material having an oil-binding capacity of at least about 100%, about 10 to about 30 weight percent of amorphous materials, and less than 30 weight percent sugar, sugar alcohol, or combinations thereof. The fillings generally have a particle size distribution with D50 of about 25 microns or less. Preferably, the fillings have a low water activity of about 0.45 or less and are substantially free of polyhydric alcohols and polyhydric alcohol-based humectants. The fillings maintain their soft and creamy texture after high-temperature, high-pressure cooking co-extrusion, subsequent baking, and throughout storage.

23 Claims, 1 Drawing Sheet

(51) Int. Cl.
   *A23P 10/35*   (2016.01)
   *A23L 33/125*  (2016.01)
   *A23P 30/20*   (2016.01)

(58) Field of Classification Search
   USPC .......................................................... 426/602
   See application file for complete search history.

(56) References Cited

U.S. PATENT DOCUMENTS

| | | |
|---|---|---|
| 4,919,947 A | 4/1990 | Barry |
| 5,366,750 A | 11/1994 | Morano |
| 5,405,625 A | 4/1995 | Biggs |
| 6,299,916 B1 | 10/2001 | Dally |
| 6,322,829 B1 | 11/2001 | McGlynn |
| 6,743,458 B2 | 6/2004 | Trout |
| 6,773,744 B1 | 8/2004 | Ward |
| 6,790,467 B2 | 9/2004 | Kostival |
| 6,793,956 B2 | 9/2004 | Trout |
| 6,863,911 B2 | 3/2005 | Zimeri |
| 6,905,719 B2 | 6/2005 | Wang |
| 6,905,720 B2 | 6/2005 | Wang |
| 7,452,564 B2 | 11/2008 | Jindra |
| 8,287,936 B2 | 10/2012 | Loh |
| 8,691,316 B2 | 4/2014 | Loh |
| 9,119,410 B2 | 9/2015 | Kino |
| 9,351,501 B2 | 5/2016 | Couttenye |
| 9,456,620 B2 | 10/2016 | Loh |
| 2002/0098267 A1 | 7/2002 | Conrad Heisey |
| 2002/0106426 A1 | 8/2002 | Trout |
| 2002/0155198 A1 | 10/2002 | Wang |
| 2002/0197354 A1 | 12/2002 | Wang |
| 2006/0286232 A1 | 12/2006 | Shah |
| 2010/0178388 A1 | 7/2010 | Fu |
| 2010/0203654 A1 | 8/2010 | Zhang |
| 2010/0239720 A1 | 9/2010 | Jensen |
| 2011/0104338 A1 | 5/2011 | Coleman |
| 2012/0093995 A1* | 4/2012 | Vemulapalli ........... A21D 13/38  426/582 |
| 2013/0101698 A1 | 4/2013 | Coleman |
| 2013/0266717 A1 | 10/2013 | Couttenye |
| 2013/0323400 A1 | 12/2013 | Repinski |
| 2015/0320057 A1 | 11/2015 | Cha |
| 2016/0286826 A1 | 10/2016 | Kino |

FOREIGN PATENT DOCUMENTS

| | | |
|---|---|---|
| EP | 2244585 | 11/2010 |
| EP | 2489279 | 8/2012 |
| WO | 2006122663 | 11/2006 |
| WO | 2010080872 | 7/2010 |
| WO | 2020025296 | 2/2020 |

* cited by examiner

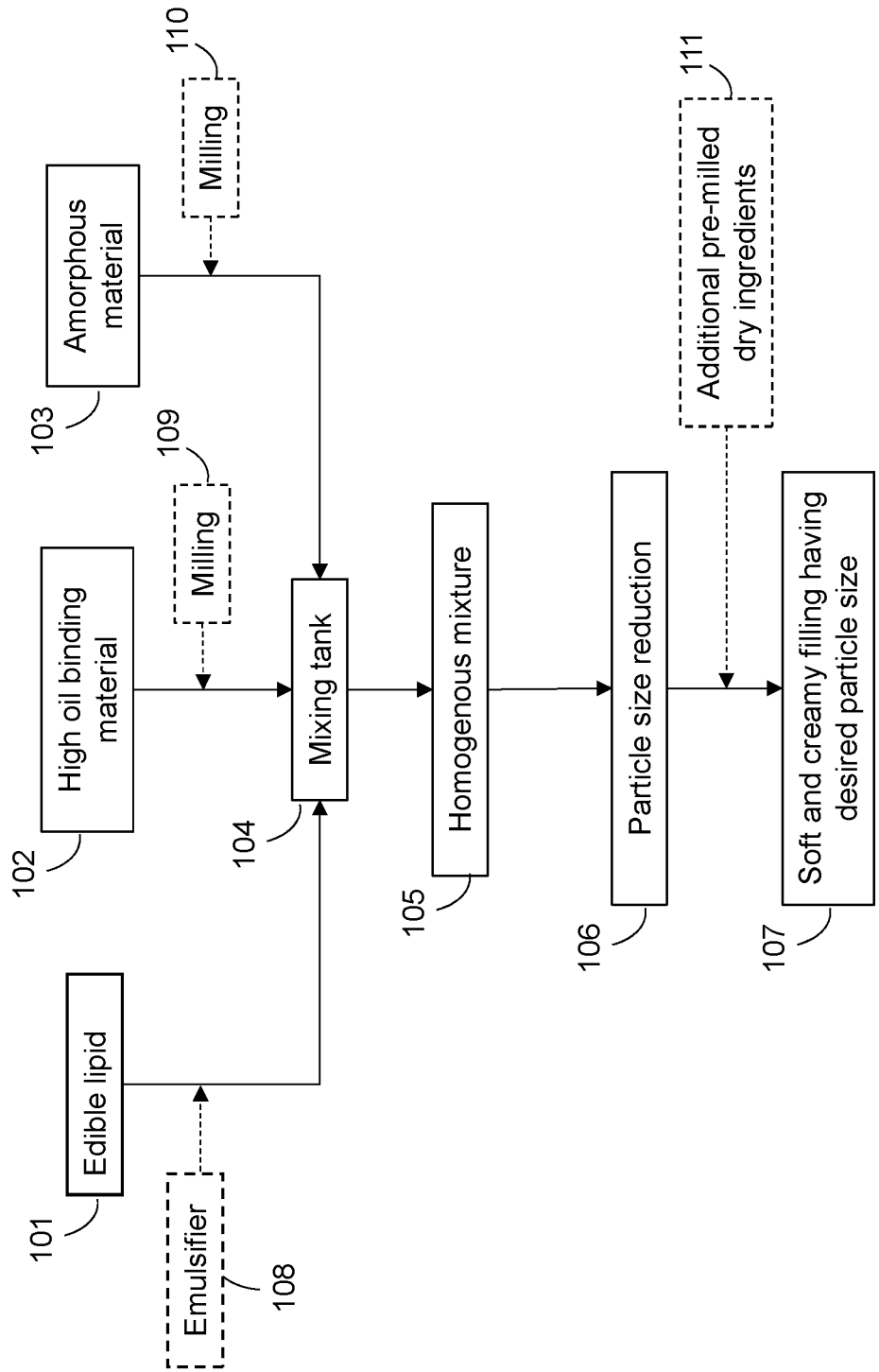

HEAT TOLERANT FILLING BASE FOR HIGH TEMPERATURE, HIGH-PRESSURE COOKING CO-EXTRUSION

FIELD

The present application generally relates to oil-based creamy fillings and, in particular, oil-based creamy fillings that are suitable for high-temperature, high-pressure cooking co-extrusion.

BACKGROUND

Foods with textural contrast, such as baked snacks with a filling, can be appealing to a broad spectrum of consumers. These dual-texture foods may include a crispy or dough component, such as a cracker or casing, and a filling component, such as a soft and creamy, shelf-stable sweet or savory filling. Typically, the filling component may exhibit the desired creamy texture from particles dispersed in a lipid and/or aqueous continuous phase. However, such fillings tend to have the shortcoming that the dispersion structure can be thermally destabilized in some instances, leading to spreading, boiling, and/or oiling-out upon heating. While not wishing to be limited by theory, it is believed that such thermal destabilization may be the result of aggregation of particles leading to lipid separation from other filling ingredients. Thus, this shortcoming renders manufacture of a dual-texture snack challenging because the thermal exposure of the filling often needs to be carefully controlled.

One approach to producing dual-texture snacks includes high-temperature, high-pressure cooking co-extrusion. In this approach, a dough casing is cooked/extruded at high temperatures, pressure, and shear conditions while the filling is injected at the die to co-extrude filled snacks. However, this approach is limited by the thermal instability or intolerance of the filling component at cooking co-extrusion temperatures of, for example, about 135° C. or higher commonly used for cooking/co-extruding filled snacks. When filling components are exposed to high-temperature, high-pressure cooking co-extrusion conditions, the filling can suffer from product defects such as filling spreading and oozing out, boiling-out, oiling-out, loss of smoothness, and discoloration, which can result in a filling having an undesirable, hardened texture.

Prior filling compositions have been formulated to include high amounts of water activity (Aw) lowering humectants such as, for example, polyols, glycerin, sugars, syrups, and the like, to improve thermal stability. However, these prior fillings are generally unacceptable from an organoleptic standpoint, especially in reduced-sweetness and savory fillings (such as a cheese-based filling) due to unwanted sweetness and/or unpleasant aftertaste resulting from the use of humectants such as glycerin.

Given that reduced-sweetness and/or savory snack products are increasingly desired by health-conscious consumers, a soft and creamy textured lipid-based food filling suitable for high-temperature, high-pressure-cooking co-extrusion is provided as described herein.

SUMMARY

In some embodiments, the filling includes about 30 wt. % to about 45% of an edible lipid, the edible lipid forming a continuous lipid phase in the filling. The edible lipid may have a melting point of about 45° C. or lower. The edible lipid may include, for example, at least one of soybean oil, corn oil, sunflower oil, palm oil, palm kernel oil, coconut oil, canola oil, cocoa oil, milk fat, and combinations thereof. In some embodiments, the filling includes substantially no high-melting lipid having a melting point of about 70° C. or greater.

The filling further includes about 0.5 wt. % to about 5 wt. % of a high oil-binding capacity material. In some approaches, the high oil-binding capacity material has an oil-binding capacity material of greater than 100%, and in some approaches greater than 120%. The high oil-binding material may include, for example, at least one of starch, protein, fiber, gum and combinations thereof. In some approaches, the high oil-binding material may include one or more edible fibers containing at least 80% of edible fibers. In some approaches, some or all of the high oil-binding material included in the filling may be insoluble oat fiber.

The filling also includes about 10 wt. % to about 30 wt. % of an amorphous material, and in some approaches about 10 wt. % to about 25 wt. % of the amorphous material. The amorphous material may include, for example, at least one of milk powder, dairy powder, cheese powder, cocoa powder, fruit or vegetable powders, maltodextrin, corn syrup solids, and combinations thereof.

The filling generally contains less than 30 wt. % sugar, sugar alcohol, or combinations thereof, such that the filling is generally a low-sweetness or savory filling. To this end, the filling preferably contains substantially no high-intensity sweetener.

The filling generally contains less than about 5% moisture and has a water activity (Aw) of about 0.45 or less. In some approaches, the filling contains substantially no polyhydric alcohols.

The filling generally has a particle size distribution with D50 of about 25 microns or less, and in some approaches about 20 microns or less. In some approaches, the particle size distribution with desired D50 may be obtained by milling dry ingredients prior to blending the milled dry ingredients with the edible lipid. In other approaches, the particle size distribution with desired D50 may be obtained by blending dry ingredients with the edible lipid to form a blended mixture and milling the blended mixture. In yet other approaches, the particle size distribution with desired D50 is obtained by blending dry ingredients with the edible lipid to form a blended mixture, milling the blended mixture, and adding additional dry ingredients to the milled blended mixture.

In some embodiments, the filling may further include an emulsifier such as, for example, lecithin, monoglyceride, diglyceride, and combinations thereof. The emulsifier may be included in the filling in an amount of about 0.05 wt. % to about 2 wt. % of the filling.

A method of preparing a soft and creamy textured lipid-based food filling suitable for high-temperature, high-pressure cooking co-extrusion is also described herein. In some approaches, the filling may be prepared by combining an edible lipid having a melting point of about 45° C. or lower, a high oil-binding capacity material, and an amorphous material to form a substantially homogeneous mixture, and subjecting the mixture to a particle size reduction process to obtain a particle size distribution with D50 of about 25 microns or less, and in some approaches about 20 microns or less.

The edible lipid may be included in an amount of about 30 wt. % to about 45 wt. %. The edible lipid may include, for example, at least one of soybean oil, corn oil, sunflower oil, palm oil, palm kernel oil, coconut oil, canola oil, cocoa oil, milk fat, and combinations thereof. In some embodiments, the filling includes substantially no high-melting lipid having a melting point of about 70° C. or greater.

The high oil binding capacity material has an oil-binding capacity of greater than 100%, and in some approaches greater than 120%, and may be included in an amount of about 0.5 wt. % to about 5 wt. %. The high oil-binding material may include, for example, at least one of starch, protein, fiber, gum and combinations thereof. In some approaches, the high oil-binding material may include one or more edible fibers containing at least 80% of edible fibers. In some approaches, some or all of the high oil-binding material included in the filling may be insoluble oat fiber.

The amorphous material may be included in an amount of about 10 wt. % to about 30 wt. %, and in some approaches about 10 wt. % to about 25 wt. %. In some approaches, the amorphous material may include, for example, at least one of milk powder, dairy powder, cheese powder, cocoa powder, fruit or vegetable powders, maltodextrin, corn syrup solids, and combinations thereof.

The filling is generally a low-sweetness or savory filling and contains less than 30 wt. % sugar, sugar alcohol, or combinations thereof and substantially no high-intensity sweetener.

The filling generally contains less than about 5% moisture and has a water activity (Aw) of about 0.45 or less. In some approaches, the filling contains substantially no polyhydric alcohols.

In some approaches, the particle size reduction process includes the process of bead milling. In some approaches, one or more dry ingredients are subjected to particle size reduction to obtain the particle size distribution with D50 of about 25 microns or less, and in some approaches 20 microns or less, prior to combining with the edible lipid.

In some approaches, an emulsifier may be mixed with the edible lipid prior to combining the edible lipid with the high oil-binding material and the amorphous material. The emulsifier may include, for example, at least one of lecithin, monoglyceride, diglyceride, and combinations thereof.

The soft and creamy textured lipid-based food fillings according to any embodiment described herein may have stiffness of less than 4000 Pascal and firmness of less than 60 Newton after baking at 8 min at 149° C. based on the Heat Tolerance Test. Preferably, the soft and creamy textured lipid-based food fillings have both a stiffness of less than 3000 Pascal and a firmness of less than 50 Newton after baking at 8 min at 149° C. based on the Heat Tolerance Test.

The soft and creamy textured lipid-based food fillings according to any embodiment described herein may be disposed within an edible casing material to form a crispy co-extruded food product. The edible casing material may include, for example, any suitable dough material or matrix.

A crispy co-extruded food product containing a soft and creamy textured lipid-based food filling is also described herein. The crispy co-extruded food product may be prepared by providing a soft and creamy textured lipid-based food filling according to any embodiment described herein, providing a casing material, and co-extruding the filling and the casing material to produce a co-extruded rope. In some approaches, the die temperature during co-extrusion may be from about 135° C. to about 170° C. Individual pieces are then formed from the co-extruded rope, and the individual pieces are dried to a moisture content of about 4% or less. In some approaches, the individual pieces may be dried at a temperature of from about 100° C. to about 120° C. The filling in the crispy co-extruded food product maintains its soft and creamy texture following co-extrusion and drying and throughout storage.

BRIEF DESCRIPTION OF THE DRAWINGS

FIG. 1 is a flow diagram of an exemplary method of making a soft and creamy textured lipid-based food filling suitable for high-temperature, high-pressure cooking co-extrusion.

DETAILED DESCRIPTION

The aforementioned summary and the following description are not to be taken in a limiting sense, but are made merely for the purpose of describing the general principles of exemplary embodiments and approaches. Reference throughout this specification to "one approach," "an approach," "some approaches", "an implementation", "some implementations", "some applications", or similar language means that a particular feature, component, property, or characteristic described in connection with the approach is included in at least one approach of the present invention. Thus, appearances of the phrases "in one approach," "in an approach," "in some approaches", "in some implementations", and similar language throughout this specification may, but do not necessarily, all refer to the same embodiment. In fact, it should be understood that a particular feature, component, property, or characteristic described herein with respect to one or more approaches, implementation, or applications is combinable with any other feature, component, property, or characteristic described herein in any combination unless explicitly stated otherwise.

Percentages used herein are by weight and based on the filling composition except as otherwise indicated.

The present disclosure describes soft and creamy textured lipid-based food fillings having a low water activity which can sustain typical high-temperature, high shear cooking co-extrusion conditions without significant oil separation and hardening and providing a creamy texture and mouthfeel in the finished products. The fillings described herein generally have a water activity (Aw) of 0.45 or less and a moisture content of 5% or less.

The inventors found that while prior creamy fillings having a high sugar content (for example, greater than 60 wt. % sugar) generally remained stable and maintained a soft and creamy texture after high-temperature, high-pressure cooking/extrusion and subsequent baking, savory or reduced-sweetness creamy fillings became powdery, hard, and lost their soft and creamy texture. In a typical high-temperature, high-pressure cooking co-extrusion process, the temperature at the die may be, for example, 135° C. or greater at a pressure inside the extruder of 70 to 100 bar, while the temperature of the filling may be, for example, 80° C. or greater at 150 to 220 psig.

The inventors discovered a unique combination of ingredient and process technologies which surprisingly yields a soft and creamy textured lipid-based food filling that is capable of maintaining its soft and creamy texture following high-temperature, high-pressure cooking co-extrusion and throughout shelf life.

The fillings include a limited amount of amorphous materials, which have a higher tendency of agglomeration and to expel out oil, the use of lecithin or other emulsifiers to modify the surface properties of particles, and certain amounts of high-oil binding materials such as fibers to control the oil migration during co-extrusion processing and shelf life. Without being limited by theory, the total surface area of the filling particles is increased by milling. The surface of the milled particle is coated with emulsifier and therefore becomes hydrophobic. It is believed that the increased hydrophobic surface area of the milled particles interacts with the lipid continuous phase and reduces the tendency of oiling out and particle agglomeration during cooking/extrusion, baking and storage. As a result of this improved stability, the fillings described herein are capable of maintaining their soft and creamy texture in a high-temperature, high-pressure co-extruded food product.

The fillings described herein include one or more edible lipids forming a continuous phase in the filling. Preferably, the edible lipids are low melting lipids having a melting point of about 45° C. or lower. Suitable low-melting lipids generally include hydrogenated, non-hydrogenated, or partially hydrogenated fractionated or non-fractionated oils and their mixture thereof having a melting point of about 45° C. or lower. Exemplary low-melting lipids include, for example, soybean oil, corn oil, sunflower oil, palm oil, palm kernel oil, coconut oil, canola oil, cocoa oil, milk fat, and combinations thereof.

Preferably, the fillings described herein are free or substantially free of high-melting lipids having a melting point of at least about 70° C. High-melting lipids include, for example, long chain fatty acids, their monoglycerides, diglycerides, and triglycerides, their alkaline metal salts, and other derivatives thereof. Prior savory filling formulations have included an amount of high-melting lipid to stabilize the filling and improve bake-stability. See, for example, U.S. Pat. No. 9,465,620. However, the inclusion of high-melting lipids may provide a waxy mouthfeel in the final filling, which may be undesirable in some applications. The fillings described herein unexpectedly exhibit thermal stability in high-temperature, high-pressure co-extruded applications without the use of high-melting lipids.

The fillings described herein include an amount of high oil-binding material having an oil-binding capacity greater than 100%, in some approaches greater than 115%, and in some approaches greater than 120%.

The term "oil binding capacity" as used herein refers to the amount of oil (as percent of sample weight) that an ingredient sample is capable of binding after complete saturation and subsequent centrifugation removal of oil. Generally, oil binding capacity may be measured using a similar concept as the Solvent Retention Capacity test for wheat flour, which was originally developed by Nabisco and now standardized as AACCI Method 56-11. More specifically, the following method was used to determine the oil binding capacity of various fibers used in experimental examples described herein:

For each 5.0 g of sample, 25.0 g of edible liquid oil (e.g., canola oil) was added to the sample in a pre-weighed centrifuge tube. The sample was then fully mixed in with oil by an automatic sample mixer (Shakematic 1095, Perten Instruments) shaking for 4 seconds each time and a total of 3 times. To ensure proper saturation of the sample, the tube was mixed on a vortex mixer (Fisher Scientific digital vortex mixer model 945415) at speed 5 for 6 seconds at 5 minute intervals for a total of 20 minutes. To remove excess oil, the tube was centrifuged immediately after the 20-minute saturation process at 1000 g for 15 minutes at 23° C. (Thermo Fisher Scientific Heraeus Multifuge X1R). Upon completion of centrifugation, the supernatant oil was carefully decanted, and the tube was inverted on a clean paper towel to properly drain all free oil for 10 minutes. The tube with sediment was weighed again to determine weight gain, and the oil binding capacity (expressed as % of sample weight) of the specific sample was calculated as $$\frac{\text{Weight of sediment} - \text{Weight of sample}}{\text{Weight of sample}} \times 100\%.$$

The oil binding capacity measurements were performed in duplicate.

Suitable high oil-binding materials may include, for example, starch, protein, fibers, gum etc. having an oil-binding capacity greater than 100%, in some approaches greater than 115%, and in some approaches greater than 120%. The term "fibers" as used herein generally refers to those ingredients containing at least about 80% edible fiber content, and in some approaches at least about 85% edible fiber content. In some embodiments, the high oil-binding materials include edible fibers such as, for example, insoluble oat fiber, in which some or all of the edible fibers are insoluble oat fiber.

The high oil-binding materials generally function in the filling to absorb liquid oil that may leach out into the matrix during cooking/co-extrusion, thereby controlling oil migration in the filling. If the oil binding capacity of the materials is too low, oiling out may occur, which may result in a filling having a hardened texture. Too much high oil-binding material can result in fillings that are pasty, undesirably firm, and having reduced creaminess. Thus, it is important to include a sufficient amount of high oil binding ingredients to control oil migration to yield a filling that is soft and creamy and having a desirable taste and texture.

In some approaches, the high oil binding materials may be included in the filling in an amount of about 0.5 wt. % to about 5 wt. % by weight of the filling. In some approaches, the high oil binding materials may be included in an amount of about 0.5 wt. % to about 4.5 wt. % of the filling; about 0.5 wt. % to about 4 wt. % of the filling; about 0.5 wt. % to about 3.5 wt. % of the filling; about 0.5 wt. % to about 3 wt. % of the filling; about 0.5 wt. % to about 2.5 wt. % of the filling; about 0.5 wt. % to about 2 wt. % of the filling; about 0.5 wt. % to about 1.5 wt. % of the filling; about 0.5 wt. % to about 1 wt. % of the filling.

Preferably, the high oil binding materials is insoluble oat fiber and is included in the filling in an amount of about 0.5 wt. % to about 2.5 wt. %

The fillings described herein also include an amount of amorphous materials. The term "amorphous materials" as used herein refers to materials that are not in their crystalline state. Exemplary amorphous materials include, for example, milk powder, dairy powder, cheese powder, fruit or vegetable powders, maltodextrin, corn syrup solids, and the like. Some ingredients, such as native starch, contain both amorphous and crystalline regions. These materials are considered to be amorphous materials if they will agglomerate after heating at about 125° C. for 30 min in sealed containers. Since native starch typically does not agglomerate after heating at about 125° C., it is not considered to be an amorphous material.

The inventors found that high-sugar creamy fillings, which generally do not contain high amounts of amorphous materials, can maintain their soft and creamy texture after high-temperature, high-pressure cooking co-extrusion and subsequent baking. However, savory and reduced-sweetness creamy fillings, which frequently use amorphous materials as flavoring or bulking agents, became powdery, hard, and lost their soft and creamy texture. This creates unique technical challenges for savory and reduced-sweetness fillings for cooking co-extrusion applications.

To this end, the fillings described herein generally include at least about 10 wt. % amorphous materials and, in some approaches, no more than about 40 wt. % amorphous materials. Including too much amorphous material in the filling can cause agglomeration and oiling out, yielding a filling having an undesirable mouthfeel. Thus, the fillings described herein generally include no more than about 40 wt. % amorphous materials, in some approaches no more than about 35 wt. %, in some approaches no more than about 30 wt. %, in some approaches no more than about 25 wt. % amorphous materials. In some embodiments, the filling includes about 10 wt. % to about 30 wt. % amorphous materials, and in some embodiments about 10 wt. % to about 25 wt. % amorphous materials.

The fillings described herein may also include an emulsifier. Any suitable emulsifier may be used. In some embodiments, a suitable emulsifier may include, for example, at least one of lecithin, monoglyceride, diglyceride, and combinations thereof. In some embodiments, a filling includes an emulsifier in an amount of about 0.05 wt. % to about 2 wt. % of the filling. In some embodiments, a filling includes an emulsifier in an amount of about 0.05 wt. % to about 1.5 wt. % of the filling; about 0.05 wt. % to about 1 wt. % of the filling; about 0.05 wt. % to about 0.75 wt. % of the filling; or about 0.05 wt. % to about 0.5 wt. % of the filling. Preferably, the filling includes an emulsifier in an amount of about 0.05 wt. % to about 1 wt. %.

The fillings describe herein are generally savory or reduced-sweetness creamy fillings. As such, the fillings generally include no more than about 30 wt. %, in some approaches no more than about 25 wt. %, and in some approaches no more than 20 wt. %, sugar (e.g., sucrose, fructose, glucose, maltose, lactose, etc.), sugar alcohol (e.g., maltitol, sorbitol, xylitol, mannitol, etc.), or combinations thereof. Preferably, sugar included in the filling is in the form of lactose, which has a lower level of sweetness than, for example, sucrose, fructose, and the like.

In some approaches, the fillings are substantially free of high-intensity sweeteners (e.g., saccharin, aspartame, acesulfame potassium, sucralose, neotame, advantame, stevia, etc.)

The fillings described herein may include any suitable flavoring or coloring agents, provided the filling achieved is a low-sweetness or savory filling. Suitable flavoring or coloring agents may include, for example, dehydrated powders, flavoring or color agents such as dehydrated fruit powders, cocoa powders, dairy powders, cheese powders, vegetable powders, bean powders, spices, and herbs, which may be added to the filling before and/or after milling/particle size reduction of the filling.

The fillings described herein may have little or no aqueous phase, and include substantially no polyhydric alcohols or polyhydric alcohol-based humectants such as, for example, glycerol, which tend to alter the taste and mouthfeel of the prior creamy fillings. As used herein, substantially no polyhydric alcohols or polyhydric alcohol-based humectants generally means the fillings have less than about 5 wt. %, in some approaches less than about 2 wt. %, and in some approaches less than about 1 wt. % of these ingredients. Such amounts are generally ineffective to provide any functional benefit for the fillings described herein.

The fillings described herein generally include particulates having a particle size distribution with D50 less than about 25 microns. In some embodiments, the filling has a particle size distribution with D50 of less than about 22 microns. In some embodiments, the filling has a particle size distribution with D50 of less than about 20 microns. Smaller particulates are generally more desirable, as smaller particulates were found to provide the filling with a softer texture and a creamier mouthfeel.

Suitable milling methods include, but are not limited to, the use of hammer mills, roll refiners, ball mills, bead mills, and combinations thereof. In some embodiments, the desired particle size distribution can be achieved by pre-milling dry ingredients prior to mixing the dry ingredients with the edible lipid, or by pre-mixing dry ingredients with the edible lipid to form a mixture, then milling the mixture to achieve the desired particle size, or a combination of these approaches. In some embodiments, the desired particle size distribution can be achieved by pre-mixing certain dry ingredients with the edible lipid to form a mixture, milling the mixture to the desired particle size for form a milled mixture, then mixing additional pre-milled dry ingredients into the milled mixture.

As discussed above, the unique combination of ingredient and process technologies described herein yield a soft and creamy lipid-based food filling that is suitable for high-temperature, high-pressure cooking co-extrusion applications. The suitability of a filling for use in high-temperature, high-pressure cooking co-extrusion applications may be demonstrated using the Heat Tolerance Test. The Heat Tolerance Test is designed to predict filling texture after high-temperature high-pressure co-extrusion and associated drying process by modeling the heat exposure pattern during this process with an oven baked method. The Heat Tolerance Test may be performed as described below.

Filling samples are shaped into a round disc of 3.5 mm (i.d.) by 4 mm (height) with a mold, then baked in the middle of 4 layers of Whatman® #3 filter papers (i.e. 2 on top and bottom side, respectively; 9.0 cm diameter, Whatman®, GE Healthcare Life Sciences UK Limited, Buckinghamshire, UK) in a stainless steel container with airtight lid (10 cm o.d. by 3.2 cm height, Papermart.com 8 oz shallow round steel tin can, catalog number 6512800P) for 8 min at 149° C. (set temperature, lab oven model 20E, Quincy Lab, Inc. Chicago, Ill.). The filter papers are moistened with 0.3 g water to provide relative humidity inside the container similarly to what it is in the extruder head. The baked samples are cooled at 22° C. overnight then evaluated. A filling suitable for use in high-temperature, high-pressure cooking co-extrusion applications will generally have a Young's Modulus of less than 4000 Pa and a firmness of less than 60 Newton.

Methods for preparing a soft and creamy lipid-based food filling suitable for use in high-temperature, high-pressure cooking co-extrusion are also described herein. A non-limiting example of a method for preparing an exemplary soft and creamy lipid-based food filling suitable for use in high-temperature, high-pressure cooking co-extrusion is illustrated in FIG. 1.

As shown in FIG. 1, an exemplary filling may be prepared by mixing an edible lipid 101, a high oil binding capacity material 102, and an amorphous material 103 in a mixing tank 104 to form a substantially homogenous mixture 105. The edible lipid 101, high oil binding material 102, and amorphous material 103 described with reference to FIG. 1 may include the edible lipid, high oil binding material, and amorphous material described above in the amounts described above.

In some embodiments, the edible lipid 101 may be optionally pre-mixed with an emulsifier 108 by mixing the edible lipid 101 and the emulsifier 108 at a temperature of about 43° C.±5° C. for approximately 10 min or until the fat is completely melted. The remaining ingredients, including any flavoring or coloring agents, may then be added to the mixer and blended to form the substantially homogeneous mixture 105. In some approaches, powdered ingredients may be added to the mixing tank 104 in groups and mixed for about 5 to about 20 minutes per group until the mixture is substantially homogenous.

The substantially homogenous mixture 105 is subjected to particle size reduction 106 to form a soft and creamy filling 107 having a desired particle size. A desired particle size of the filling generally comprises particulates having a particle size distribution with D50 less than about 25 microns, in some approaches less than about 22 microns, and in some approaches less than about 20 microns. Particle size reduction may be achieved using any suitable milling technique such as for example, hammer mills, roll refiners, ball mills, bead mills, and combinations thereof. Preferably, the homogenous mixture is continuously fed to a high agitation bead mill where the D50 of the particle size distribution is reduced to less than about 25 microns, in some approaches less than about 22 microns, and in some approaches less than about 20 microns.

In some embodiments, some or all of the dry ingredients, which may include some or all of the high oil binding material 102 and/or the amorphous material 103, may be optionally pre-milled (see 109 and 110 in FIG. 1) prior to mixing with the edible lipid 101 in the mixing tank 104 to form the substantially homogeneous mixture 105. In some approaches, additional pre-milled dry ingredients 111 may be optionally added to the mixture after particle size reduction 106.

In one non-limiting example, an exemplary soft and creamy lipid-based food filling suitable for use in high-temperature, high-pressure cooking co-extrusion may be prepared by adding solid fat, liquid oil, and lecithin to a mixing tank and mixing at a temperature of about 43° C.±5° C. for approximately 10 min or until the fat is completely melted. Powdered ingredients are added in the groups outlined below and mixed for 5 to 20 minutes per group until the mixture is homogenous.
  i. Group 1: Salt, Lactic acid, oat fiber, cheese powder
  ii. Group 2: maltodextrin
  iii. Group 3: Corn Starch
  iv. Group 4: Lactose After Group 2 is added, the mixing speed is increased to maintain enough turbulence to fully incorporate all ingredients. After the lactose is added in Group 4, the slurry is recirculated in the mixing tank to aid in mixing, and to ensure a homogeneous mixture. The slurry is then pumped to a hold tank with slow agitation where it maintains a temperature of between about 35° C. and about 48° C. The slurry is continuously fed to the high agitation bead mill where the particle size distribution is reduced to the desired particle size. The filling leaving the mill is typically at a temperature of about 65° C.±5° C.

The soft and creamy lipid-based food fillings described herein can be incorporated into co-extruded baked snack products using any conventional co-extrusion method. For example, the fillings may be incorporated into a crispy co-extruded snack product as described in U.S. Patent Publication 2017/0332677, which is incorporated herein by reference in its entirely.

The fillings are especially useful in the production of high-temperature, high-pressure co-extruded snacks. For example, the fillings described herein can be incorporated into co-extruded snacks such as, for example cereal-based snacks, during high-temperature, high-pressure cooking extrusion, and still maintain soft and creamy texture after co-extrusion and drying, as well as throughout shelf-life.

In one non-limiting approach, the fillings described herein may be incorporated into a co-extruded baked snack product as follows:

The filling is added to a mixing kettle and any suitable amount of powdered seasoning (which may include powdered flavors, cheese powders, or spices) may be added. The filling is then mixed for 5 to 15 minutes until the seasonings are evenly distributed, at which point the filling is then transferred into a use tank where it is pumped directly into the extrusion die and encased in the rope of extruded casing. The casing may be formed of any suitable casing material depending on the nature of the final product. Typical die temperatures are generally from about 135° C. to about 170° C.

The extruded product is then crimped into individual pieces and passed into a convective dryer for final moisture removal to obtain a moisture content of about 5% or less. Typical dryer temperatures are generally from about 100° C. to about 120° C. The dried product is then sent through a seasoning drum where oil and seasoning are applied. The product is then sent to packaging.

A better understanding of the present disclosure and its many advantages may be clarified with the following examples. The following examples are illustrative and not limiting thereof in either scope or spirit. Those skilled in the art will readily understand that variations of the components, methods, steps, and devices described in these examples can be used. Unless noted otherwise, all percentages, ratios, and parts noted in this disclosure are by weight

EXAMPLES

The following examples demonstrate the significance of various features of the fillings described herein. The fillings in Examples 1 to 5 were prepared according to formulations shown in Table 1.

TABLE 1

|  | Comparative Example 1 | Comparative Example 2 | Example 3 | Example 4 | Example 5 |
|---|---|---|---|---|---|
| Formulation: | % | % | % | % | % |
| Canola Oil | 20.5 | 20.5 | 20.5 | 20.5 | 20.5 |
| Palm Oil | 17.5 | 17.5 | 17.5 | 17.5 | 17.5 |
| Lecithin | 0.9 | 0.9 | 0.9 | 0.9 | 0.9 |
| Oat fiber | 2.1 | 0 | 2.1 | 0 | 0 |
| Soluble glucose fiber | 0 | 5.5 | 0 | 0 | 0 |
| Sugarcane fiber | 0 | 0 | 0 | 2.1 | 0 |
| Oat beta-glucan | 0 | 0 | 0 | 0 | 2.9 |
| Corn starch, native | 19.0 | 19.0 | 19.0 | 19.0 | 18.55 |
| Lactose, monohydrate | 20.35 | 16.95 | 20.35 | 20.35 | 20.0 |

TABLE 1-continued

|  | Comparative Example 1 | Comparative Example 2 | Example 3 | Example 4 | Example 5 |
|---|---|---|---|---|---|
| Maltodextrins, 10 DE | 13.7 | 13.7 | 13.7 | 13.7 | 13.7 |
| Cheddar cheese powder | 5.0 | 5.0 | 5.0 | 5.0 | 5.0 |
| Salt (sodium chloride) | 0.65 | 0.65 | 0.65 | 0.65 | 0.65 |
| Purac 60 (powdered lactic acid) | 0.3 | 0.3 | 0.3 | 0.3 | 0.3 |
| TOTAL | 100.0 | 100.0 | 100.0 | 100.0 | 100.0 |
| Processing: | No Milling | Milled | Milled | Milled | Milled |

Example 1

Comparative Filling

The comparative filling in this example demonstrates the significance reducing the particle size of the filling. The comparative filling in this example has a formulation that is the same as the exemplary filling in example 3, but the comparative filling in this example has not undergone particle size reduction. The fiber used in this comparative example is insoluble oat fiber (Canadian Harvest® HF300-58, J. Rettenmaier USA, Schoolcraft, Mich.) which has an oil binding capacity of about 181%. All ingredients were mixed in a heated mixer at about 49° C. until homogenous and free of lumps. After mixing, the filling was cooled to room temperature overnight before evaluation. This filling had a particle size distribution with D50 of 33.7 microns.

Example 2

Comparative Filling

The comparative filling in this example demonstrates the significance of the oil-binding capacity of fiber included in the filling. The comparative filling in this example has a formulation that is similar to the exemplary fillings in examples 3 to 5 but includes a higher amount of different type of fiber, which has an oil binding capacity of less than 120%. Like the exemplary fillings in examples 3 to 5, the comparative filling in this example has undergone particle size reduction.

The fiber used in this example is soluble glucose fiber (Promitor® SGF70R, Tate & Lyle, Decatur, Ill.) with oil binding capacity of about 70%. All ingredients were first mixed in a heated mixer at about 49° C., then passed through a high agitation bead mill (Buhler K8) filled with 82% of 1.5 mm ceramic beads with a flow rate at about 110 g/min and grinding speed of 1200 rpm. The milled filling had a particle size distribution with D50 of 15.6 microns. The sample was cooled to room temperature overnight before evaluation.

Example 3

Exemplary Filling

The filling in this example is a non-limiting example of an inventive filling in accordance with the present disclosure. The filling in this example includes the same ingredients and formulation as the comparative filling in example 1, but the particle size of the filling in this example was reduced using a high agitation bead mill. All ingredients were first mixed in a heated mixer at about 49° C., then passed through a high agitation bead mill (WAB KD-15) filled with 80% of 1.6-2.0 mm ceramic beads with a flow rate at about 1200 g/min and grinding speed of 1300 rpm. The milled filling had a particle size distribution with D50 of about 14 microns. The sample was cooled to room temperature overnight before evaluation.

Example 4

Exemplary Filling

The filling in this example is a non-limiting example of an inventive filling in accordance with the present disclosure. The filling in this example includes insoluble sugarcane fiber (Vitacel® SF601, J. Rettenmaier USA, Schoolcraft, Mich.) which has oil binding capacity of about 189%. The mixing and milling process are same as described above in Example 3. The milled filling had a particle size distribution with D50 of 15.6 microns.

Example 5

Exemplary Filling

The filling in this example is a non-limiting example of an inventive filling in accordance with the present disclosure. The filling in this example includes soluble oat beta-glucan fiber (PromOat®, Tate & Lyle, Decatur, Ill.) which has oil binding capacity of about 121%. The mixing and milling process are same as described above in Example 3. The milled filling had a particle size distribution with D50 of 14.4 microns. The sample was cooled to room temperature overnight before evaluation

Example 6

Evaluation of Fillings

The comparative fillings from comparative examples 1 and 2 and the exemplary fillings from examples 3 to 5 were evaluated using the benchtop Heat Tolerance Test (HTT) described above. The following parameters of the HTT baked fillings were evaluated: (1) stiffness and firmness; (2) oil migration to filter papers based on % of filling weight; and (3) roundtable sensory evaluation. The results of the HTT testing are illustrated in Table 2.

Stiffness and firmness of the baked fillings were measured by a compression test performed by a TA.XT plus texture analyzer (Texture Technologies Corp., South Hamilton, Mass.). After cooling, the baked filling was removed from the container, and the bottom layers of filter papers were carefully peeled to avoid damage to the baked surface. Then with a 1" (diameter) cylinder probe, the bare sample was compressed to 40% of its strain at the speed of 1 mm/s. The force encountered (N) during the test was plotted against time (i.e. compression distance) for calculations. The stiffness of sample was determined by calculating the Young's Modulus (Pa) of the initial peak (at about 15% strain), and firmness was determined by peak force (N) which was the maximum force encountered during the compression test. All measurements were performed in triplicates. A satisfactory heat tolerant filling should have a Young's Modulus of less than 4000 Pa and a firmness of less than 60 Newton.

Particle size distribution of the filling was measured in oil dispersion using Malvern Mastersizer 3000 with Hydro SM wet dispersion unit. The median for a volume distribution—D50 is used as the particle size measure.

The texture of each baked filling was described by roundtable sensory evaluation. The attributes include creamy texture, softness, and smoothness of the filling.

The fillings from comparative examples 1 and 2 were dried and hardened after the HTT. Based on this test, these two comparative fillings have higher oil migration to filter papers, and much higher stiffness and firmness measurements, as shown in Table 2. On the other hand, the exemplary fillings from examples 3 to 5 maintained their soft and creamy texture after baking.

TABLE 2

| | Comparative Example 1 | Comparative Example 2 | Example 3 | Example 4 | Example 5 |
|---|---|---|---|---|---|
| D50, μm | 33.7 | 13.0 | 14.2 | 15.6 | 14.4 |
| Stiffness (Young's Modulus, Pa) | 2320.5 | 3688.4 | 283.1 | 516.6 | 643.0 |
| Firmness (Peak Force, N) | 75.6 | 76.7 | 18.7 | 34.3 | 23.7 |
| Texture | dried, hardened | dried, hardened | soft, creamy | soft, creamy | soft, creamy |

Example 7

High-Temperature High-Pressure Cooking Co-Extruded Snacks Made with Comparative and Exemplary Fillings Two fillings with the same formulation as described in Example 3 were processed with different degrees of milling. As shown in Table 3, the low grinding filling (comparative filling) has a particle size distribution with D50 of 28.8 micron, and the high grinding filling (exemplary filling) has a particle size distribution with D50 of about 17.0 micron. These fillings were mixed with 3.5% of seasoning (Kerry Ingredients and Flavours USA, Beloit, Wis.) until homogenous. The fillings were then extruded with a Buhler Twin Screw Extruder (high-temperature, high-shear, cooking extruder) at the fill level of about 45% (by weight). The extruded products were dried at 104° C. for about 9 minutes to achieve shelf-stable moisture of about 3.5%. The extruded snacks were stored in sealed metalized pouches and evaluated at the $4^{th}$ week after production. Based on the results from a qualitative descriptive analysis sensory panel as illustrated in Table 3 below, the extruded products made with the exemplary filling had a higher awareness of filling and a more creamy, smooth (moist) texture of filling perceived compared to the comparative filling.

TABLE 3

Particle size and key sensory difference based on a qualitative descriptive analysis sensory panel

| | Particle Size of Filling Base D50 (μm) | Awareness of Filling Mean Scores * | Moistness of Filling Mean Scores * |
|---|---|---|---|
| Extruded product with comparative filling | 28.8 | 53.34 | 46.54 |
| Extruded product with exemplary filling | 17.0 | 59.48 | 60.37 |

* These sensory attributes are significantly different at a 95% confidence level based on a 100 point scale.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicants' contribution. The actual scope of the protection sought is intended to be defined in the following claims when viewed in their proper perspective based on the prior art.

What is claimed is:

1. A soft and creamy textured lipid-based food filling comprising:

about 30 wt. % to about 45 wt. % of an edible lipid forming a continuous lipid phase;

about 0.5 wt. % to about 5 wt. % of a high oil-binding capacity material, the high oil-binding capacity material having an oil-binding capacity of greater than 100%;

about 10 wt. % to about 30 wt. % of an amorphous material;

less than 30 wt. % sugar, sugar alcohol, or combinations thereof; and a water activity (Aw) of about 0.45 or lower, wherein the filling has a particle size distribution with D50 of about 25 microns or less, and wherein the filling maintains a soft and creamy texture after cooking co-extrusion at a die temperature of about 135° C. and an extruder pressure of about 70 to 100 bar.

2. The filling of claim 1, wherein the filling contains substantially no polyhydric alcohols.

3. The filling of claim 1, where in the filling has a stiffness of less than 4000 Pascal and firmness of less than 60 Newton after baking at 8 min at 149° C. based on a heat tolerance test.

4. The filling of claim 1, wherein the filling contains about 10 wt. % to about 25 wt. % of the amorphous material.

5. The filling of claim 1, wherein the amorphous material comprises at least one of milk powder, dairy powder, cheese powder, cocoa powder, fruit or vegetable powders, maltodextrin, corn syrup solids, and combinations thereof.

6. The filling of claim 1, wherein the edible lipid has a melting point of about 45° C. or lower and the filling includes substantially no high-melting lipid having a melting point of at least about 70° C.

7. The filling of claim 1, wherein the high oil-binding capacity material comprises at least one of starch, protein, fiber, gum, and combinations thereof.

8. The filling of claim 1, wherein the filling includes substantially no high-intensity sweetener.

9. A crispy co-extruded food product comprising the filling of claim 1 disposed within an edible casing material.

10. A method of making a crispy co-extruded food product, the method comprising:
providing the soft and creamy textured lipid-based food filling of claim 1;
providing a casing material;
co-extruding the filling and the casing material to produce a co-extruded rope;
forming individual pieces from the co-extruded rope; and
drying the individual pieces to a moisture content of about 4% or less,
wherein the filling maintains its soft and creamy texture following co-extrusion and drying.

11. The method of claim 10, wherein the die temperature during co-extrusion is from about 135° C. to about 170° C.

12. The method of claim 10, wherein the individual pieces are dried at a temperature of from about 100° C. to about 120° C.

13. A method of making a soft and creamy textured lipid-based food filling, the method comprising:
combining about 30 wt. % to about 45 wt. % of an edible lipid, about 0.5 wt. % to about 5 wt. % of a high oil-binding capacity material, and about 10 wt. % to about 30 wt. % of an amorphous material to form a substantially homogeneous mixture; and
subjecting the mixture to a particle size reduction process to obtain a particle size distribution with D50 of about 25 microns or less,
wherein the edible lipid has a melting point of about 45° C. or lower,
the high oil-binding capacity material has an oil-binding capacity of greater than 100%, and
the filling maintains a soft and creamy texture after cooking co-extrusion at a die temperature of about 135° C. and an extruder pressure of about 70 to 100 bar.

14. The method of claim 13, wherein the filling contains substantially no polyhydric alcohols.

15. The method of claim 13, where in the filling has a stiffness of less than 4000 Pascal and firmness of less than 60 Newton after baking at 8 min at 149° C. based on a heat tolerance test.

16. The method of claim 13, wherein the filling has a water activity (Aw) of about 0.45 or lower.

17. The method of claim 13, wherein one or more dry ingredients are subjected to particle size reduction to obtain a particle size distribution with D50 of about 25 microns or less prior to combining with the edible lipid.

18. The method of claim 13, wherein the amorphous material is included in an amount of about 10 wt. % to about 25 wt. % by weight of the filling.

19. The method of claim 13, wherein the amorphous material comprises at least one of milk powder, dairy powder, cheese powder, cocoa powder, fruit or vegetable powders, maltodextrin, corn syrup solids, and combinations thereof.

20. The method of claim 13, wherein the filling includes substantially no high-melting lipid having a melting point of at least about 70° C.

21. The method of claim 13, wherein the high oil-binding capacity material comprises at least one of starch, protein, fiber, gum, and combinations thereof.

22. The method of claim 13, further comprising mixing an emulsifier with the edible lipid prior to combining the edible lipid with the high oil-binding material and the amorphous material.

23. The method of claim 13, wherein the filling includes substantially no high-intensity sweetener.

\* \* \* \* \*